(12) United States Patent
Murata et al.

(10) Patent No.: US 7,188,126 B2
(45) Date of Patent: Mar. 6, 2007

(54) ELECTRONIC DOCUMENT MANAGEMENT METHOD AND PROGRAM

(75) Inventors: Ken Murata, Kawasaki (JP); Taizo Shirakata, Kawasaki (JP); Makoto Sasahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 714 days.

(21) Appl. No.: 10/358,895

(22) Filed: Feb. 6, 2003

(65) Prior Publication Data
US 2003/0187881 A1 Oct. 2, 2003

(30) Foreign Application Priority Data
Mar. 29, 2002 (JP) ............................. 2002-093732

(51) Int. Cl.
*G06F 17/30* (2006.01)
(52) U.S. Cl. ...................... 707/204; 707/200; 707/201; 707/202; 707/203; 707/205; 707/10
(58) Field of Classification Search ........ 707/200–205, 707/10, 3; 709/200, 218, 219
See application file for complete search history.

(56) References Cited

U.S. PATENT DOCUMENTS

| | | | |
|---|---|---|---|
| 5,812,793 A | | 9/1998 | Shakib et al. |
| 6,073,141 A | * | 6/2000 | Salazar ....................... 707/204 |
| 6,256,644 B1 | * | 7/2001 | Shibayama ................. 707/205 |
| 6,295,541 B1 | * | 9/2001 | Bodnar et al. .............. 707/203 |
| 6,516,327 B1 | * | 2/2003 | Zondervan et al. ......... 707/200 |
| 6,571,245 B2 | * | 5/2003 | Huang et al. ................. 707/10 |
| 6,654,746 B1 | * | 11/2003 | Wong et al. .................. 707/10 |
| 6,823,362 B2 | * | 11/2004 | Eshghi ....................... 709/203 |
| 6,985,893 B1 | * | 1/2006 | Warner et al. ................. 707/2 |
| 2001/0042073 A1 | | 11/2001 | Saether et al. | |

OTHER PUBLICATIONS

German Patent Office Action, dated Dec. 2, 2005.

\* cited by examiner

*Primary Examiner*—Cam-Y Truong
(74) *Attorney, Agent, or Firm*—Staas & Halsey LLP

(57) ABSTRACT

A subordinate server creates an event notice list, that is a list of the stored electronic document files having a high use frequency, and copies it onto a host server such that the host server holds it on a subordinate server-by-server basis. When an electronic document file is changed in a certain subordinate server, the subordinate server copies the changed electronic document file onto the host server, and at the same time, checks if the changed document file is present on an event notice list of another subordinate server held by the host server, and notifies a change event to the other subordinate server for storing it on a change history list, only when the file is present. If the subordinate server is requested for looking up an electronic document file, and the requested electronic document file is present on the change history list, the subordinate server copies the corresponding electronic document file from the host server for allowing the requester to look up.

18 Claims, 17 Drawing Sheets

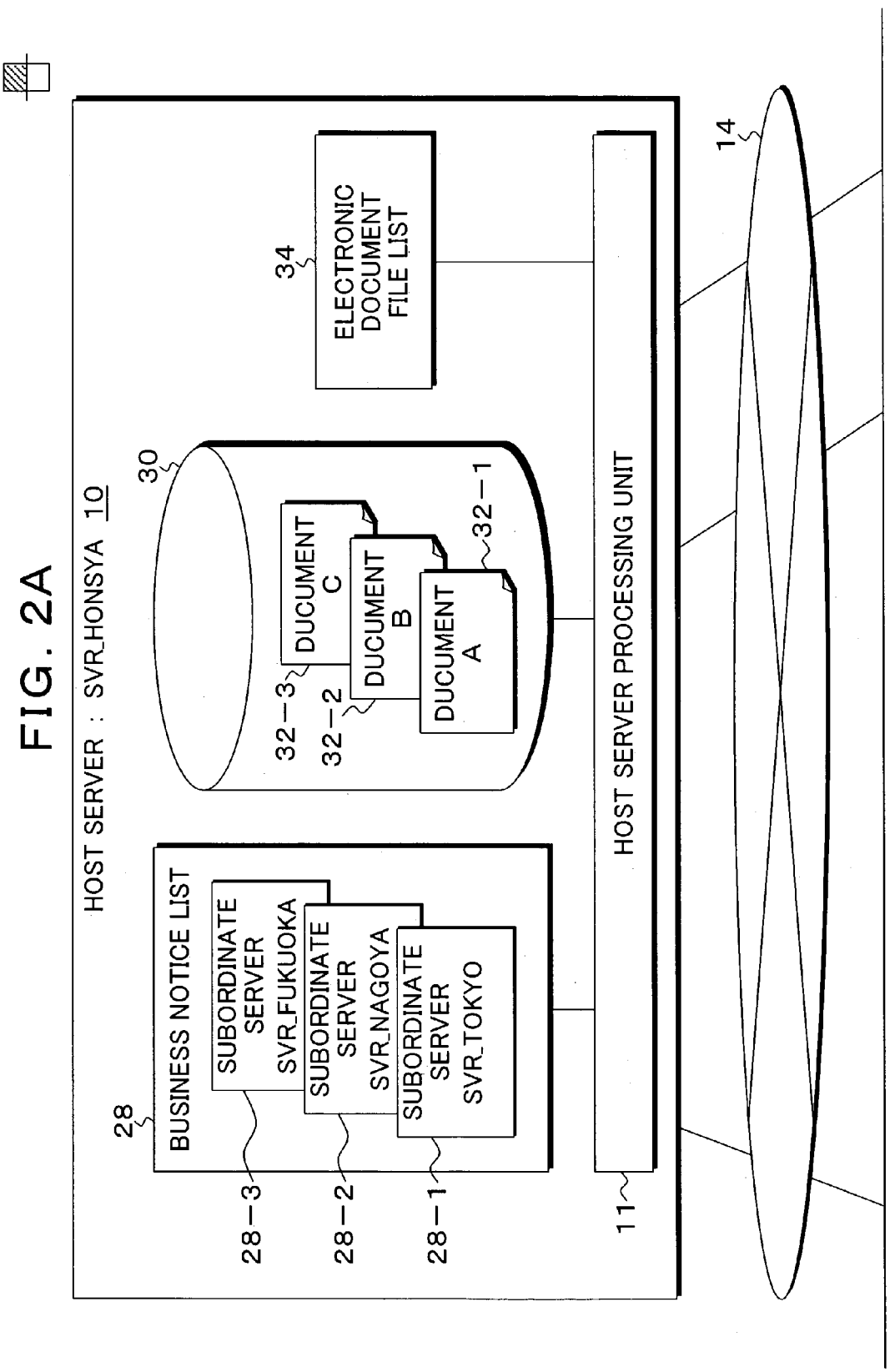

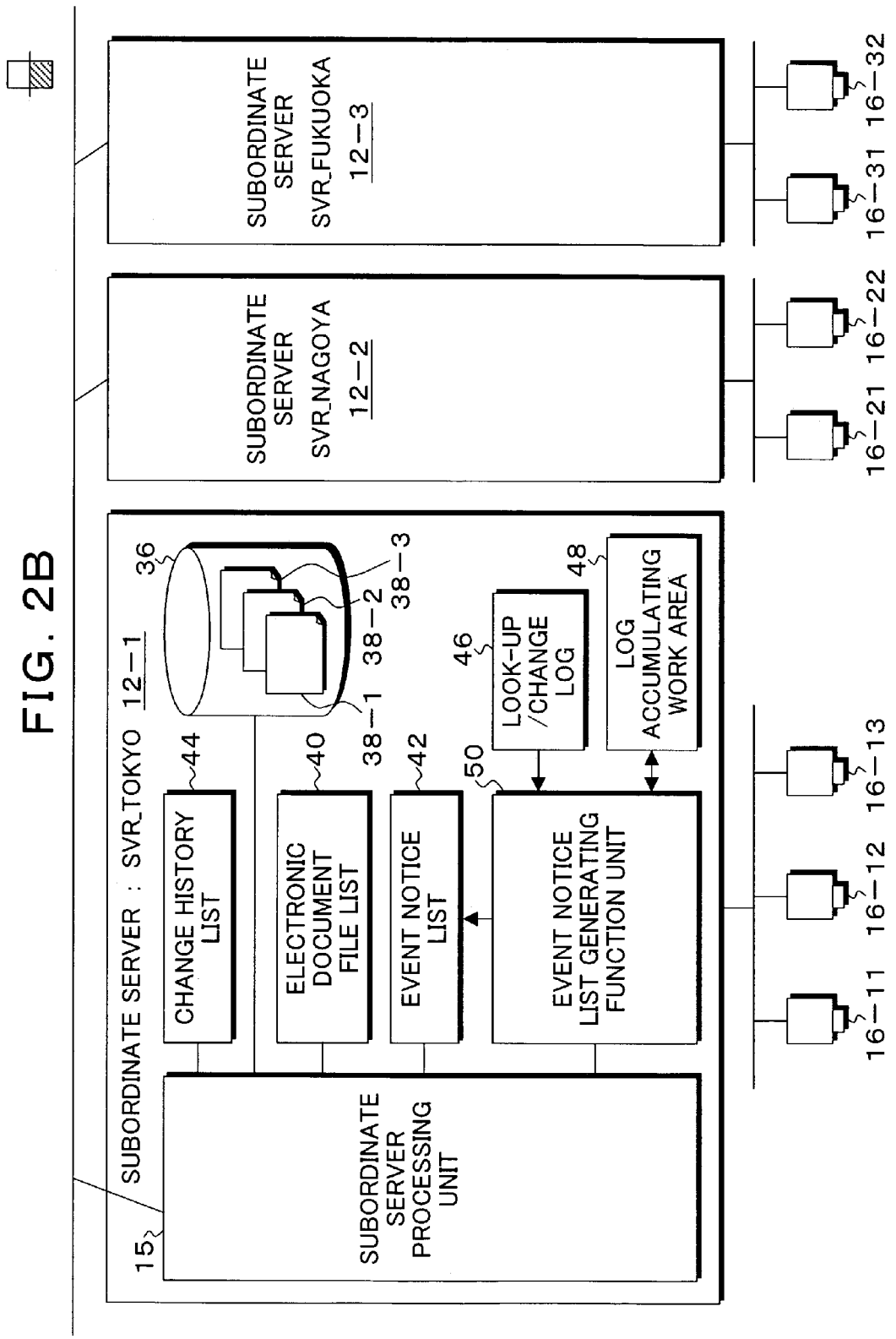

| ELECTRONIC DOCUMENT FILE NAME | DATE&TIME OF CHANGE |
|---|---|
| A CO.,LTD./HEAD OFFICE/FIRST BUSINESS DEPARTMENT /APRIL 2001 SALES RECORD.dat | 2001/5/1 10:15:45 |
| A CO.,LTD./HEAD OFFICE/FIRST BUSINESS DEPARTMENT /MAY 2001 SALES RECORD.dat | 2001/5/1 17:10:00 |
| A CO.,LTD./HEAD OFFICE/GENERAL AFFAIRS DEPARTMENT /EMPLOYEE INFORMATION.dat | 2001/5/9 13:45:22 |

| ELECTRONIC DOCUMENT FILE NAME | DATE&TIME OF LOOK-UP/CHANGE |
|---|---|
| A CO.,LTD./HEAD OFFICE/FIRST BUSINESS DEPARTMENT /APRIL 2001 SALES RECORD.dat | 2001/5/1 10:15:45 |
| A CO.,LTD./HEAD OFFICE/FIRST BUSINESS DEPARTMENT /MAY 2001 SALES RECORD.dat | 2001/5/1 17:10:00 |
| A CO.,LTD./HEAD OFFICE/GENERAL AFFAIRS DEPARTMENT /EMPLOYEE INFORMATION.dat | 2001/5/9 13:45:22 |

| ELECTRONIC DOCUMENT FILE NAME | FREQUENCY OF LOOK-UP/CHANGE |
|---|---|
| A CO.,LTD./HEAD OFFICE/FIRST BUSINESS DEPARTMENT /APRIL 2001 SALES RECORD.dat | 11 |
| A CO.,LTD./HEAD OFFICE/FIRST BUSINESS DEPARTMENT /MAY 2001 SALES RECORD.dat | 2 |
| A CO.,LTD./HEAD OFFICE/GENERAL AFFAIRS DEPARTMENT /EMPLOYEE INFORMATION.dat | 38 |

68          70

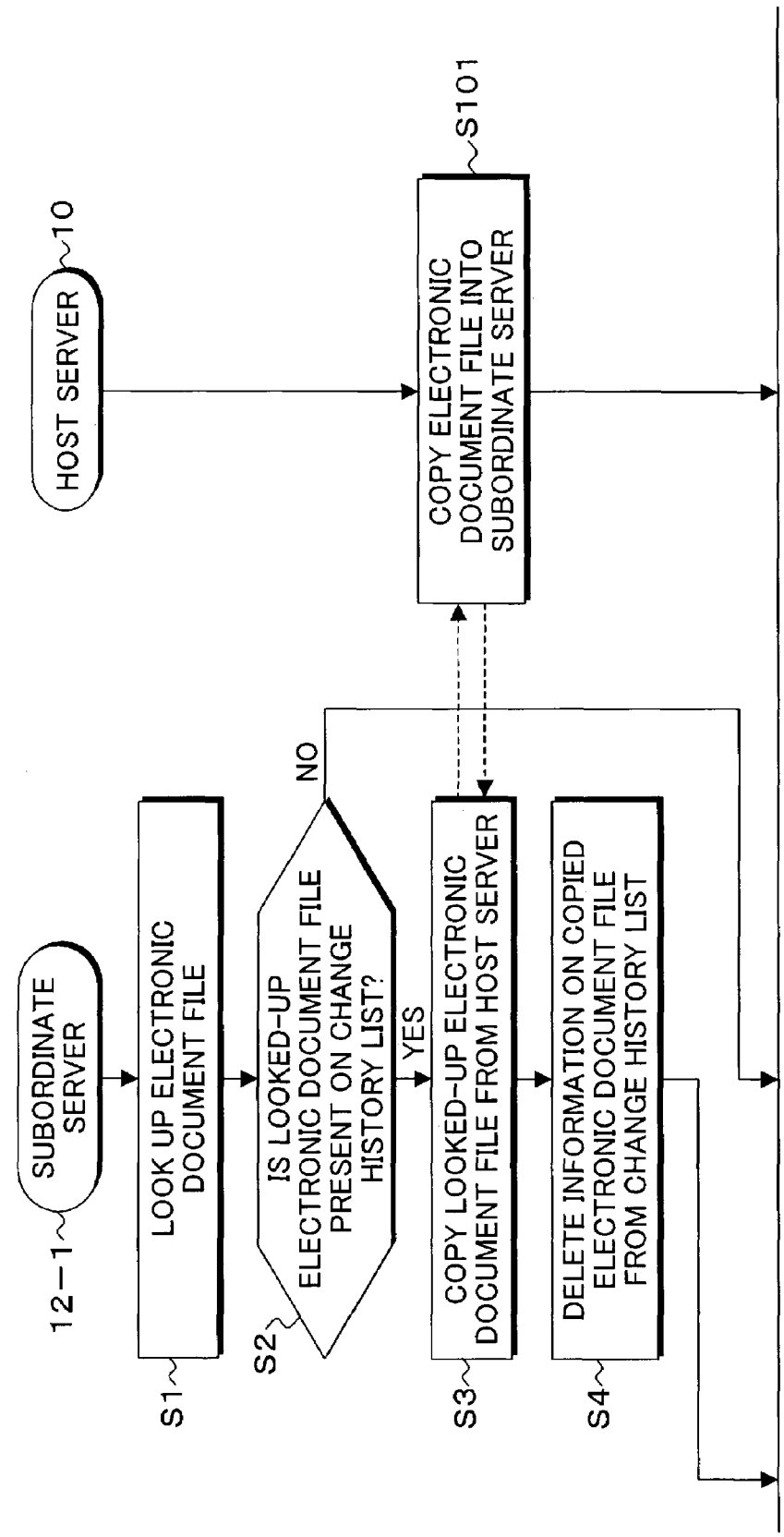

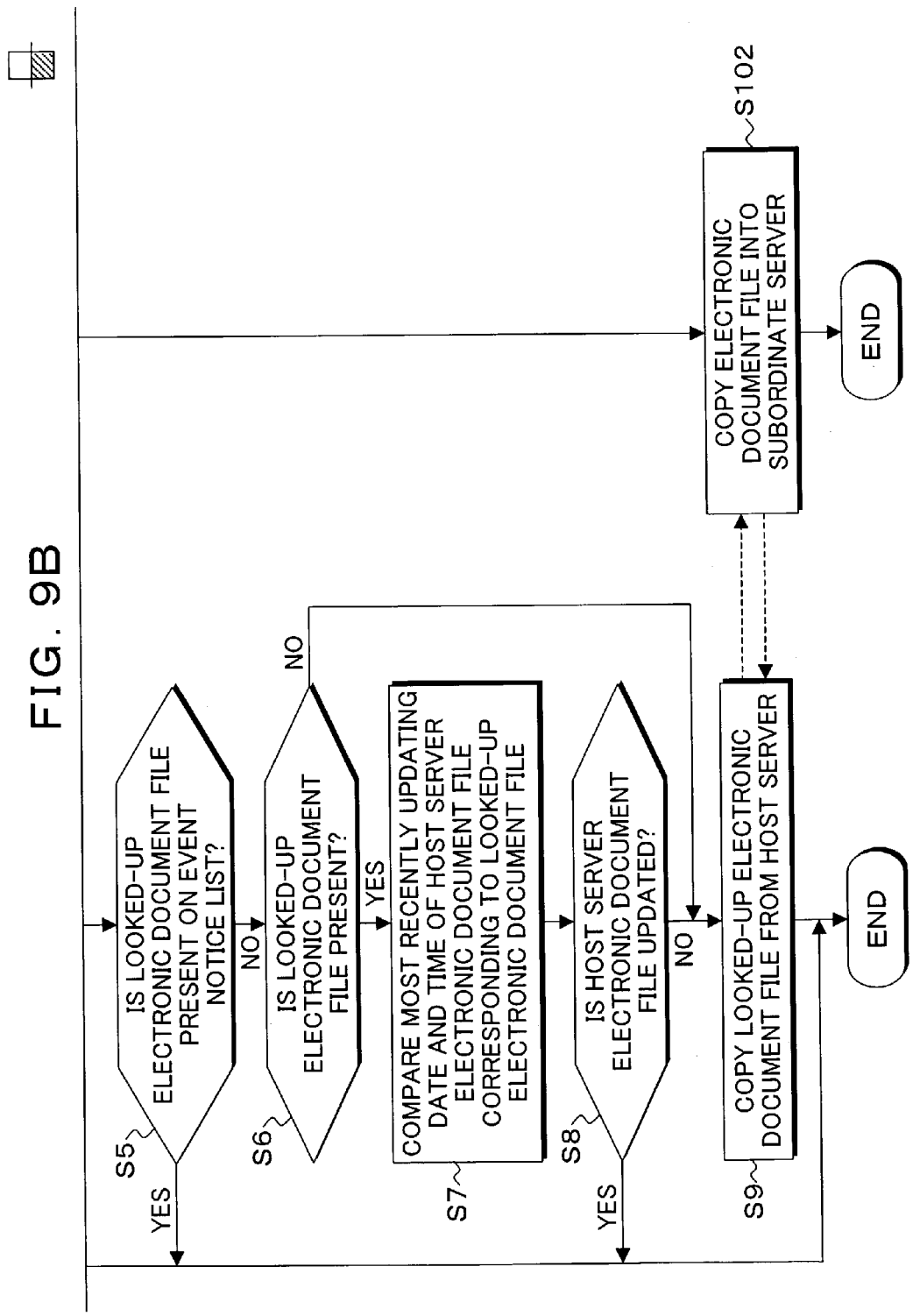

ELECTRONIC DOCUMENT MANAGEMENT METHOD AND PROGRAM

BACKGROUND OF THE INVENTION

1. Field of the Invention

The present invention relates generally to an electronic document management method and program in which an electronic document file kept by a host server is copied onto a plurality of subordinate servers such that clients can utilize the electronic document file, and more particularly to an electronic document management method and program ensuring an effective transfer of the electronic document file from the host server to the subordinate server depending on the status of utilization of the clients.

2. Description of the Related Arts

Recently, electronic document management systems for computerizing and handling documents essential for corporate activities are being put into practical use, and their consequential paper-less operation can reduce costs required for printing, sorting, delivery, storage, operation, etc. of documents, and improve efficiency of work and quality of work. In such electronic document management systems, electronic documents created by a mainframe, office computer held by a corporation, or general applications including Windows (R), and further by a variety types of accounting packages are stored in a server that runs in a Web-based environment, such that the electronic documents can be used from a head office, department, business office, branch office, or further from a client at business partner. In order to practically share the load of a network and server, a decentralized electronic document system is proposed, in which an electronic document is shared by a plurality of servers. Many of such decentralized electronic document systems employ a hierarchical structure reflecting the organization of a company, such as a host server representing a head office of a company, and a subordinate server representing a branch office of a company. In the decentralized electronic document system, an electronic document file kept by a host server is copied onto a subordinate server, such that a user looks up the electronic document file using a client computer connected to the subordinate server. Also, in the system, an electronic tag can be added when a user looks up the electronic document file of the subordinate server. In the following description, the addition of the electronic tag to the electronic document file is defined as the change of the electronic document file. In the decentralized electronic document systems, when the electronic document file that is changed by the addition of the electronic tag in the subordinate server is copied onto the host server, in order to reflect the change into all subordinate servers, the changed electronic document file is copied onto all subordinate servers across the board. Also, a competition takes place when a change is made by the addition of the electronic tag to the same electronic document files in a plurality of subordinate servers, and the changed electronic document files are copied onto the host server at the same time. In the conventional systems, when a competition of changing the electronic document file takes place in the host server, as described above, only any one of the changes made in the plurality of subordinate servers is reflected into the electronic document file of the host server.

However, in the conventional decentralized electronic document systems, when the electronic document file is changed in the subordinate server, the changed electronic document file is copied onto all the other subordinate servers, after being copied onto the host server. This increases the data transfer amount on the network and the number of transfers, and also increases the load applied to the network. Especially, even if the changed electronic document file is copied onto all of the subordinate servers, there is a high possibility of copying the electronic document file with few possibility of being looked up or changed, depending on the subordinate servers. Because of copying the electric document file, that is not required to be copied, onto the subordinate server, the data transfer amount on the network and the number of communications are increased, and thus the load of the network is increased. Furthermore, as the subordinate server has to keep the electronic document file having no possibility of being looked up or changed in the subordinate server, there is the problem of higher facility cost, to meet the requirement of larger storage capacity, and beforehand arrangements for providing excessive storage area for storing the electronic document file which would be rarely used. In addition, when a competition takes place because the electronic tag is added to the same electronic document files at the same time in the plurality of subordinate servers, there is the problem that only a specific electronic tag is reflected into the host server, and the rest of the electronic tags would not be used.

SUMMARY OF THE INVENTION

According to the present invention there is provided an electronic document management method and program in which a decentralized server environment is constructed, ensuring an effective transfer of an electronic document file from a host server to a subordinate server depending on the actual status of use.

(Electronic Document Management Method)

The present invention is directed at providing an electronic document management method, in which a host server stores an electronic document file, and copies it onto a plurality of subordinate servers such that clients look up or change the electronic document file in each subordinate server. According to the inventor's knowledge, in decentralized electronic document managements, the subordinate server more frequently looks up or changes the electronic document file related to the organization in which it is involved, but less frequently looks up or changes all of electronic document files stored in the host server equally. In short, the electronic document file to be looked up or changed by the subordinate server is characterized by unbalanced frequency of being looked up or changed, among every subordinate server.

Thus, a first aspect of the present invention provides an electronic document management method comprising:

creating an event notice list for electronic document files kept in the subordinate server, the event notice list being a list of electronic document files having a high frequency of use, and copying the event notice list onto the host server so that the host server keeps the event notice list on a subordinate-server-by-subordinate-server basis;

when a change of an electronic document file takes place in a certain subordinate server, copying the changed electronic document file onto the host server, making a check of whether the changed electronic document file is present or not on the event notice lists of the other subordinate servers kept by the host server, and only when the file is present, notifying a change event to the other subordinate servers to store the change event on a change history list; and when the subordinate server receives a request for looking up an electronic document file, and if the requested electronic document file is present on the change history list, copying the corresponding electronic document file from the host server such that the requester is allowed to look up the file.

Therefore, according to the present invention, if a change takes place in the electronic document file in the subordinate server, the changed electronic document file is copied onto the host server, and if the event notice list, that is defined on a subordinate server-by-server basis and held by the host server, includes the changed electronic document file, the changed event only is notified to the subordinate server. Furthermore, at the time when a change is made in the electronic document file, the electronic document file itself is not copied onto the subordinate server, but the subordinate server looks up the electronic document file, and only when the electronic document file is present on the change history list held by the subordinate server, the electronic document file is copied from the host server to the subordinate server. This method reduces the data transfer amount on the network and communication frequency, and thus the load applied to the network is reduced. Furthermore, as only the electronic document file to be looked up is stored from the host server to the subordinate server, the storage area for the electronic document file can be reduced.

Herein, the change of the electronic document file includes adding an electronic tag to the electronic document file. The subordinate server creates a log when a client looks up or changes an electronic document file, and at a predetermined timing, accumulates the look-up number of times and updating number of times from the log, the subordinate server if the accumulated number of times exceeds a predetermined number of times, creating the event notice list for copying onto the host server. Therefore, the event of only the electronic document file with high use frequency is notified to the host server, and is copied when the electronic document file is changed. The subordinate server deletes the change history of an already copied electronic document file from the change history list, if the looked up electronic document file is present on the change history list such that the corresponding electronic document file is copied from the host server for allowing the client to look up the file. For this reason, the latest state is always reflected into the use frequency of the electronic document file in the subordinate server. The subordinate server looks up the event notice list if the electronic document file requested for looking up is not present on the change history list, and allows the client to look up the electronic document file stored in an electronic document storage if it is present on the event notice list. As described above, if the electronic document file is not present on the change history list, but present on the event notice list, said electronic document file stored in the electronic document storage area is proved to be the latest one, so clients can be allowed to look up this latest file. The subordinate server copies an electronic document file stored in the host server onto the electronic document storage area for allowing the client to look up the file, if the electronic document file requested for looking up is not present in the electronic document storage area. Therefore, clients are always allowed to look up the latest electronic document file. If the electronic document file requested for looking up is present in the electronic document storage area, and if the last updating date of the electronic document file stored in the host server is most recent, the subordinate server copies the electronic document file onto the electronic document storage area for allowing the client to look up. In this case as well, clients are always allowed to look up the latest electronic document file.

In the present invention, when a competition has occurred of a change of the electronic document file in the upper server, that is, when a competition of change takes place, after clients add an electronic tag to the same electronic document file copied from the host server for updating the file, in a plurality of subordinate servers, so that the updated electronic document files are copied onto the host server simultaneously in terms of the time, all the electronic tags added in each subordinate server are merged and added to the electronic document file. Therefore, as the electronic tags can be of a standalone-type, and have no mutually dependent relation, all competing and changed electronic tags are reflected into the corresponding electronic document files, by means of merging all electronic tags added in the subordinate servers.

(Electronic Document File Management Method for Subordinate Server)

A second aspect of the present invention provides an electronic document management method for a subordinate server in which when a plurality of electronic document files kept in a host server are copied, clients look up or change the plurality of electronic document files.

The electronic document management method for the subordinate server of the present invention comprises:

creating an event notice list for the stored electronic document files, the event notice list being a list of electronic document files having a high frequency of use, and copying the list onto the host server such that the host server keeps the lists on a subordinate-server-by-subordinate-server basis, and if a change is made in an electronic document file, copying the changed electronic document file onto the host server;

storing on a change history list a change event to be notified when the electronic document file, that is changed by another subordinate server, is present on the event notice list of its own held by the host server; and copying the corresponding electronic document file from the host server for allowing looking up, when an electronic document file is requested for looking up, and if the requested electronic document file is present on the change history list. Herein, the change of the electronic document file includes adding an electronic tag to the electronic document file.

The electronic document management method for the subordinate server further comprises creating a log when a client looks up or changes an electronic document file, and at a predetermined timing, accumulating the look-up number of times and updating number of times from the log, and if the accumulated number of times exceeds a predetermined number of times, creating the event notice list for copying onto the host server. The electronic document management method for the subordinate sever further comprises deleting the change history of an already copied electronic document file from the change history list, if the looked up electronic document file is present on the change history list such that the corresponding electronic document file is copied from the host server for allowing the client to look up the file. The electronic document management method for the subordinate server further comprises looking up the event notice list if the electronic document file requested for looking up is not present on the change history list, and allowing the client to look up the electronic document file stored in an electronic document storage if it is present on the event notice list. The electronic document management method of the subordinate server further comprises copying an electronic document file stored in the host server onto the electronic document storage area for allowing the client to look up the file, if the electronic document file requested for looking up is not present in the electronic document storage area.

The electronic document management method of the subordinate server further comprises, if the electronic document file requested for looking up is present in the electronic document storage area, and if the last updating date of the electronic document file stored in the host server is most recent, copying the electronic document file onto the electronic document storage area for allowing the client to look up.

(Electronic Document File Management Method for Host Server)

A third aspect of the present invention provides an electronic document management method for a host server which keeps an electronic document file, the host server copying the electronic document file onto a plurality of subordinate servers such that clients look up and change the file in each subordinate server.

This electronic document management method for the host server comprises:

copying from the subordinate server an event notice list for the electronic document files stored in the subordinate server, the event notice list being a list of electronic document files having a high frequency of use, to hold the copied list on a subordinate-server-by-subordinate-server basis;

when a change of an electronic document file takes place in a certain subordinate server, copying the changed electronic document file and checking whether the changed electronic document file is present on an event notice list of another subordinate server, and only when the file is present, notifying a change event to the other subordinate servers, for storing the change event on the change history list; and only when an electronic document file requested for look up in the subordinate server is present on the change history list, copying the corresponding electronic document file onto the subordinate server for looking up. Herein, the change of the electronic document file includes adding an electronic tag to the electronic document file.

In the electronic document management method for the host server, when a competition of change takes place, after clients add an electronic tag to the same electronic document file for updating the file, in a plurality of subordinate servers, so that the updated electronic document files are copied onto the host server simultaneously in terms of the time, all the electronic tags added in each subordinate server are merged and added to the electronic document file.

(Program for Subordinate Server)

A fourth aspect of the present invention provides a program for a subordinate server. The program for a subordinate server allows a computer forming a subordinate server, on which a plurality of electronic document files kept in a host server are copied such that the client is allowed to look up or change the files, to execute:

a step of creating an event notice list for the stored electronic document files, the event notice list being a list of electronic document files having a high frequency of use, and copying the list onto the host server such that the host server keeps the lists on a subordinate-server-by-subordinate-server basis;

a step of, if a change is made in an electronic document file, copying the changed electronic document file onto the host server;

a step of storing on a change history list a change event to be notified when the electronic document file, that is changed by another subordinate server, is present on the event notice list of its own held by the host server; and a step of copying the corresponding electronic document file from the host server for allowing looking up, when an electronic document file is requested for looking up, and if the requested electronic document file is present on the change history list. Details of the program for the subordinate server are basically the same as those of the electronic document management method for the subordinate server.

(Program for Host Server)

A fifth aspect of the present invention provides a program for a host server. The program for a host server of the present invention allows a computer forming a host server which stores an electronic document file and which copies the electronic document file onto a plurality of subordinate servers such that the client looks up or changes the electronic document file in each subordinate server, to execute:

a step of copying from the subordinate server an event notice list for the electronic document files stored in the subordinate server, the event notice list being a list of electronic document files having a high frequency of use, to hold the copied list on a subordinate-server-by-subordinate-server basis;

a step of, when a change of an electronic document file takes place in a certain subordinate server, copying the changed electronic document file and checking whether the changed electronic document file is present on an event notice list of another subordinate server, and only when the file is present, notifying a change event to the other subordinate servers, for storing the change event on the change history list; and a step of, only when an electronic document file requested for look up in the subordinate server is present on the change history list, copying the corresponding electronic document file onto the subordinate server for looking up. Details of the program for the host server are basically the same as those of the electronic document management method for the host server.

The above and other objects, aspects, features and advantages of the present invention will become more apparent from the following detailed description when taken in conjunction with the drawings.

BRIEF DESCRIPTION OF THE DRAWINGS

FIGS. 2A and 2B are block diagrams showing a functional configuration for an electronic document management processing according to the present invention;

FIG. 4 is a diagram for describing a change history list shown in FIGS. 2A and 2B;

FIG. 6 is a diagram for describing a change/look-up log shown in FIGS. 2A and 2B;

FIG. 7 is a diagram for describing a log accumulation work area shown in FIGS. 2A and 2B;

FIGS. 9A and 9B are flow charts showing processing for looking up an electronic document file according to the present invention;

DETAILED DESCRIPTION OF THE PREFERRED EMBODIMENT

Figure 1:
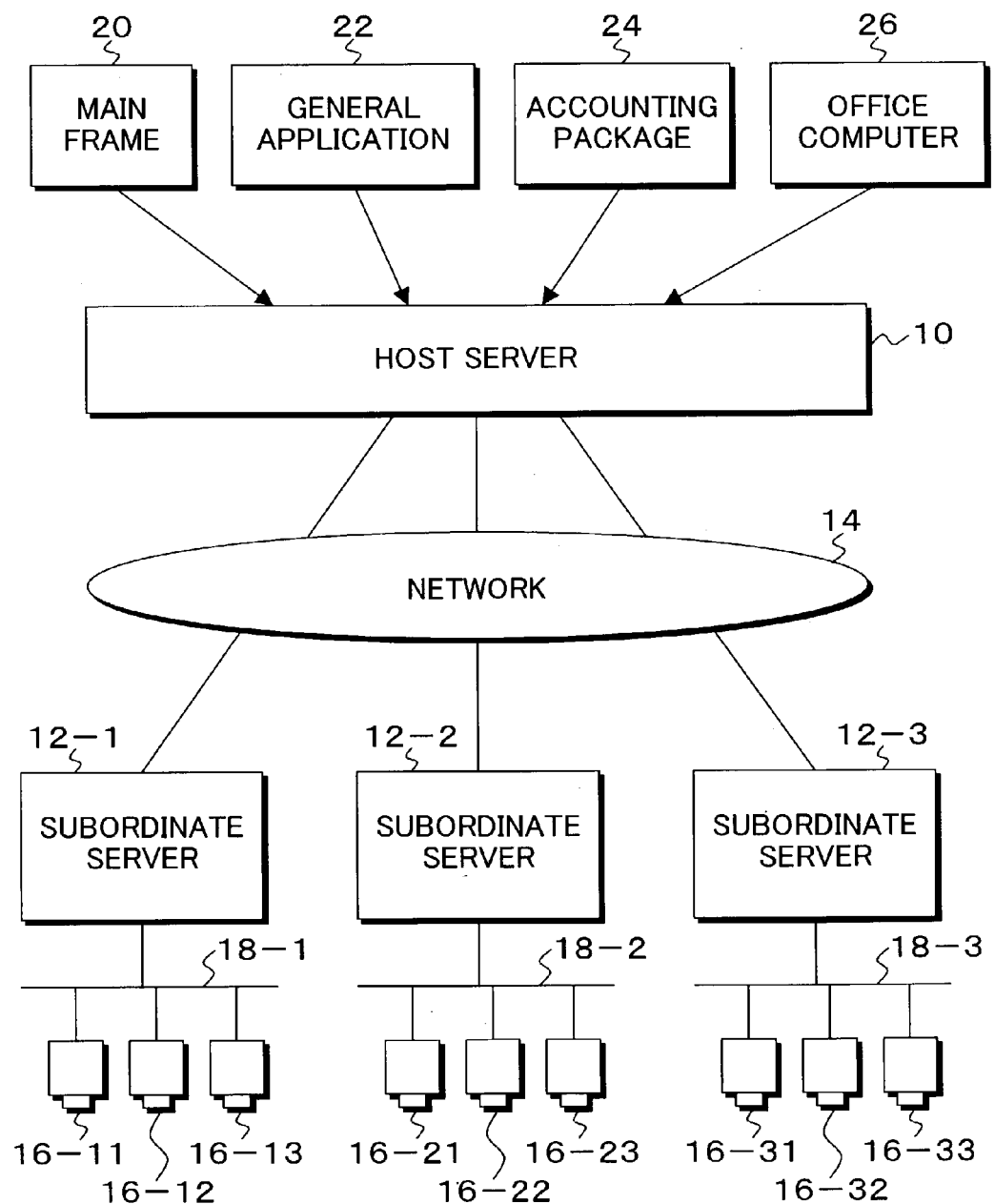
FIG. 1 is a block diagram showing a decentralized type server environment to which the present invention applies.

FIG. 1 is a block diagram showing a decentralized type server environment to which an electronic document management method according to the present invention applies. When a method for using the present invention at a company is taken as an example, a host server 10 is installed as a head office server. To this host server 10, subordinate servers that are installed for every branch office, for example 12-1, 12-2, and 12-3 are connected through a network 14. To each of the subordinate servers 12-1–12-3, client computers 16-11 through 16-13, 16-21 through 16-23, and 16-31 through 16-33, that function as users, are connected through, for example, intranets 18-1, 18-2, and 18-3. A variety kinds of electronic document files that are electronically created by a mainframe 20, general applications 22 including Windows (R), a variety kinds of accounting packages 24, and an office computer 26 are fetched and stored in the host server that functions as the head office server.

FIGS. 2A and 2B are block diagrams showing a functional configuration for an electronic document management processing according to the present invention. The host server 10 has a server name "SVR_HONSYA". A host server-processing unit 11 is provided on the host server 10, and on the host server-processing unit 11, an event notice list storage area 28, an electronic document storage area 30, and an electronic document file list 34 are provided. In the event notice list storage area 28, event notice lists 28-1, 28-2, and 28-3 are stored, corresponding to the subordinate servers 12-1 through 12-3 connected through the network 14. In the electronic document storage area 30, a lot of electronic documents 32-1, 32-2, 32-3 . . . , that are accepted from the outside, are stored. On the electronic document file list 34, a document list stored in the electronic document storage area 30 is held. On the other hand, taking the subordinate server 12-1 as an example, a configuration for the subordinate servers 12-1, 12-2 and 12-3 connected to the host server 10 through the network 14 is described as follows: On the subordinate server 12-1, a subordinate server processing unit 15 is provided, and an electronic document storage area 36, an electronic document file list 40, an event notice list 42, a change history list 44, a look-up/change log 46, a log accumulation work area 48, and an event notice list creating function unit 50 are provided on the subordinate server processing unit 15. In the electronic document storage area 36, electronic document files 38-1–38-3 copied from the host server 10 are stored. On the electronic document file list 40, a list of the electronic document files 38-1–38-3, that are stored in the electronic document storage area 36, is stored. A log is recorded on the look-up/change log 46, when the electronic document file is looked up or updated from client computers 16-11–16-13. The event notice list creating function unit 50 expands the look-up/change log 46 in the log accumulation work area 48 at a predetermined timing, and counts the number of times when the electronic document file is used by the client computers 16-11–16-13, to create the event notice list 42 as to the electronic document file with the use frequency exceeding a specified number of times. The event notice list 42 is copied onto the event notice list storage area 28 of the host server 10, and becomes an event notice list 28-1 of the subordinate server 12-1. On the change history list 44, the information on the electronic document file is stored, to which a change event is notified from the host server 10. Here, the data structure of each list provided on the host server 10 and the subordinate server 12-1 is described.

Figure 3:
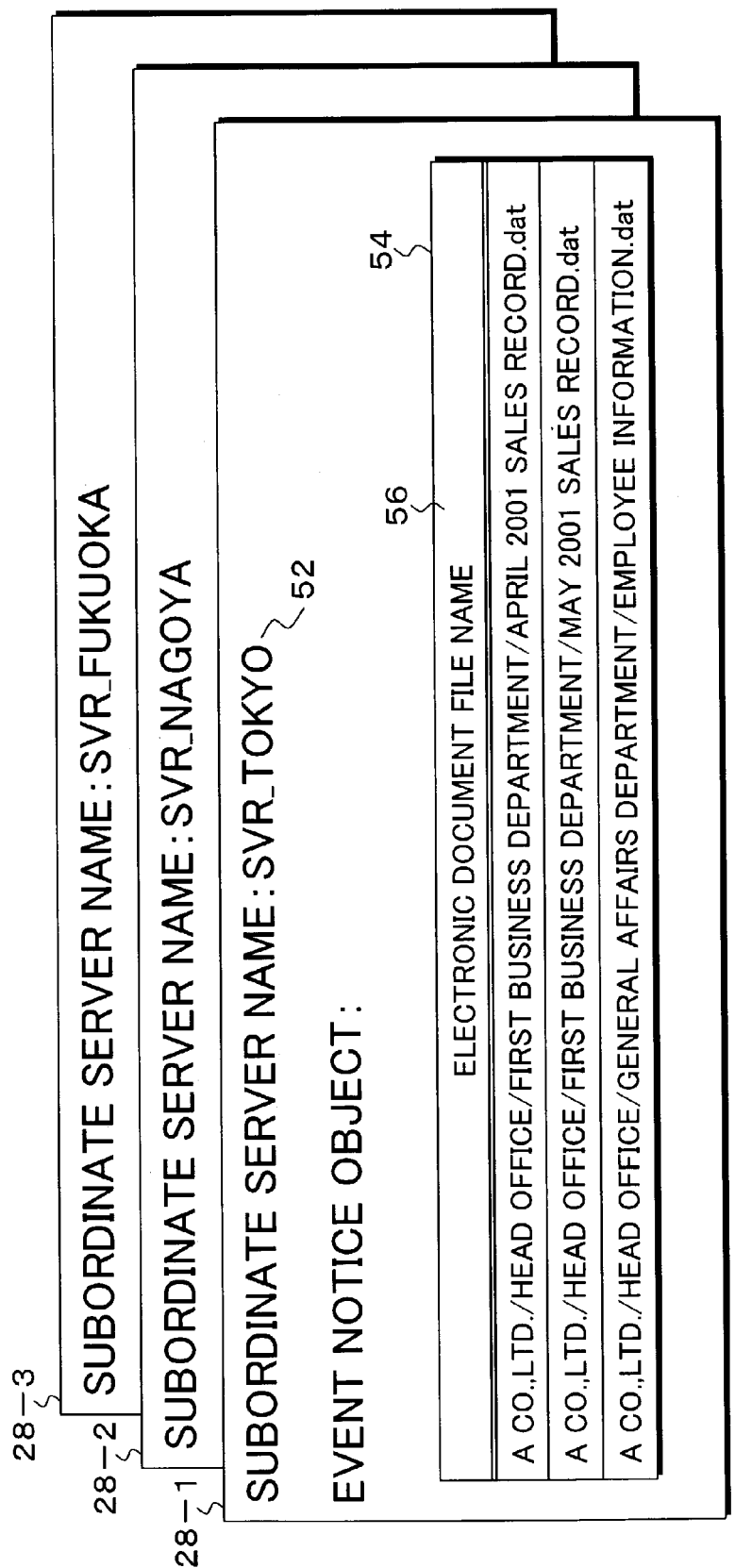
FIG. 3 is a diagram for describing an event notice list shown in FIGS. 2A and 2B.

In FIG. 3, the event notice lists 28-1–28-3 that are stored in the host server 10, are taken up, and the data structures are indicated in terms of the event notice list 28-1. The event notice list 28-1 has a subordinate server name 52 and event notice object 54 as information. The event notice object 54 holds an electronic document file name 56. The electronic document file name 56 is a list of records, on which every subordinate server holds the electronic document file name to be the object of the event notice. FIG. 3 shows the event notice list copied onto the host server 10, and the event notice list 42 on the side of the subordinate server 12-1 has the same configuration as shown in FIG. 3. Needless to say, the event notice list on the side of the subordinate server is the list of itself.

FIG. 4 shows a data structure for a change history list 44 stored in the subordinate server 12-1 shown in FIGS. 2A and 2B. The change history list 44 comprises an electronic document file name 58, to which a change event is notified from the host server 10, and a list of records, that hold a change data 60.

Figure 5:
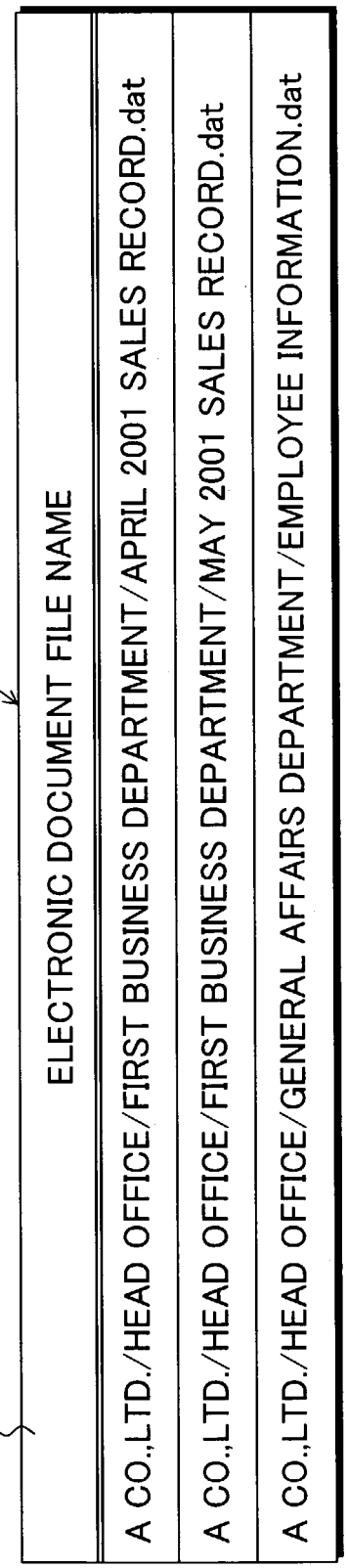
FIG. 5 is a diagram for describing an electronic document file list shown in FIGS. 2A and 2B.

FIG. 5 shows a data structure for en electronic document file list 40 provided on the host server 10 shown in FIGS. 2A and 2B. The electronic document file list 40 includes a list of records holding the electronic document file name 62 for the electronic document files 32-1–32-3 stored in the electronic document storage area 30 of the host server 10. The electronic document file list 40 provided on the subordinate server 12-1 has the same data structure, and in this case, the electronic document file list 40 includes a list of records holding the electronic document file name for the electronic document files 38-1–38-3 stored in the electronic document storage area 36.

FIG. 6 shows a data structure for a change/look-up log 46 in the subordinate server 12-1 shown in FIGS. 2A and 2B. The change/look-up log 46 comprises an electronic document file name 64 to be specified when the electronic document file is looked up or changed in the subordinate server 12-1, and a list of record holding a look-up/change date and time 66.

FIG. 7 shows a data structure for a log accumulation work area 48 in the subordinate server 12-1 shown in FIGS. 2A and 2B. This log accumulation work area 48 is used as a work area when the event notice list creating function unit 50 creates the event notice list 42, and comprises an electronic document file name 68, and a list of records of a look-up/change frequency 70 for counting the look-up and change number of times.

Next, procedure for processing for managing an electronic document according to the present invention is described. Processing for managing an electronic document according to the present invention is mainly classified into (1) Processing for changing an electronic document file; and (2) Processing for looking up an electronic document file.

The processing for changing an electronic document file is a process for notifying an event change to the other subordinate server with high frequency of using the changed electronic document file, when the host server recognized a change in the electronic document file made by the subordinate server. Processing for looking up the electronic document file is a process for allowing the client computer to look up the latest electronic document file, when a request is made from the client computer to the subordinate server.

Figure 8:
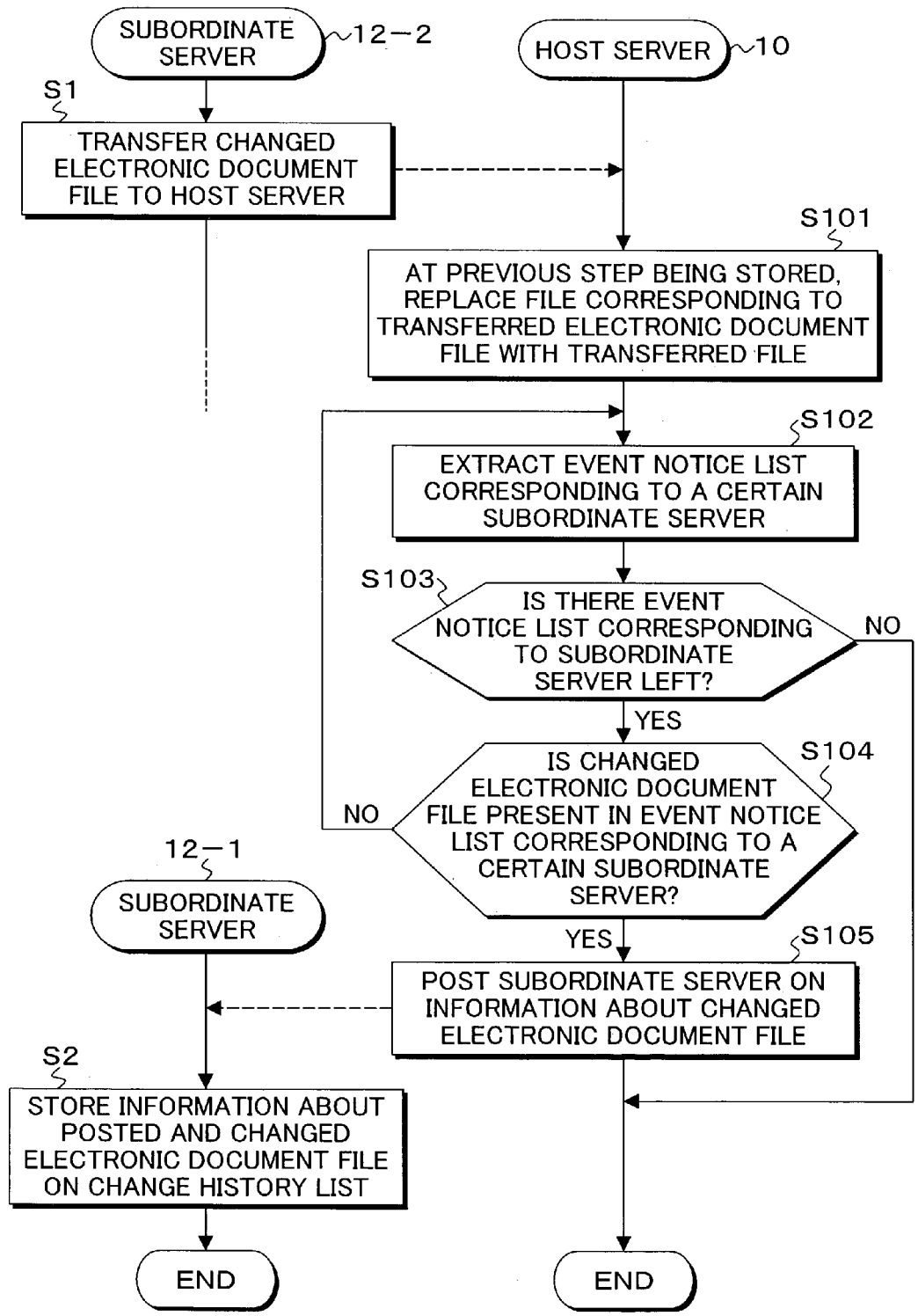
FIG. 8 is a flow chart showing processing for changing en electronic document file according to the present invention.

FIG. 8 is a flow chart showing procedures of processing for changing the electronic document file according to the present invention. FIGS. 9A and 9B are flow charts showing procedures of processing for looking up the electronic document file according to the present invention. Using FIG. 10, processing for changing and looking up the electronic document file in the flow charts shown in FIGS. 8, 9A and 9B is specifically described.

Figure 10:
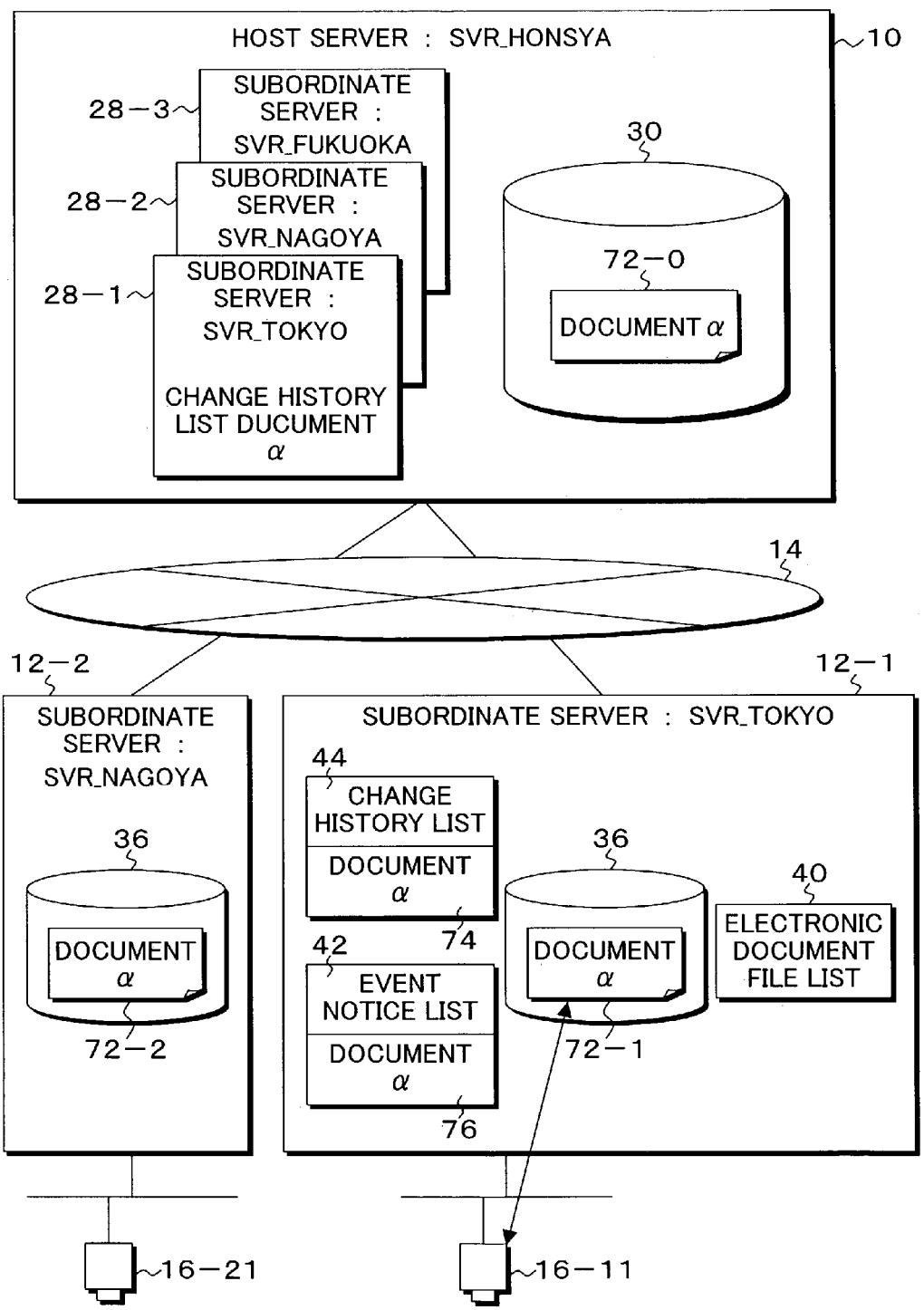
FIG. 10 is a diagram for describing specific examples of processing for changing and looking up an electronic document file according to the present invention.

FIG. 10 takes a case as an example, where an electronic document file 72-2, noted as "document α" in a subordinate server 12-2, is changed, and the changed document is later looked up by a client computer 16-11 connected to the subordinate server 12-1. First of all, referring to the flow charts shown in FIGS. 8A and 8B, and further FIG. 10, processing for changing the electronic document file according to the present invention is described. In response to a request from a client computer 16-21 to a subordinate server 12-2, an electronic document file 72-2, here "document α", is looked up, and the electronic document file is changed when a user added an electronic tag to the electronic document file 72-2. As described above, when a change is made in the electronic document file 72-2 in the subordinate server 12-2, the changed electronic document file 72-2 of "document α" is transferred from the subordinate server 12-2 to the host server 10 at step S1 shown in FIGS. 8A and 8B. At step S101, the host server 10 replaces an electronic document file 72-0 stored in the electronic document storage area 30 corresponding to the "document α" of the electronic document file 72-2 transferred from the subordinate server 12-2, with the electronic document file 72-2 transferred from the subordinate server 12-2. Processing from step S102 to step S105 in the next host server 10 is a process adapted to look up the event notice list for every subordinate server in order to determine a subordinate server to which a change event is notified, and notify the change event to the subordinate server. First of all, the event notice list 28-1 of the subordinate server 12-1 is taken out at step S102. At the next step S103, if the event notice list to be checked is not present, processing ends. If the event notice list of a subordinate server, which has not been checked, is present, checking is made whether or not the changed electronic document file is present on the event notice list 28-1 taken out at step S102. If the event notice list 28-1 includes the changed electronic document file, an event change is notified from the host server 10 to the subordinate server 12-1 at step S105, and in the subordinate server 12-1, an event change 74 to the "document α" of the electronic document file is stored on the change history list 44. In such a way, when finishing processing the event notice list 28-1 of the subordinate server 12-1, the system returns to step S102 again, and repeats the following steps as before, after checking the event notice list 28-1 of the next subordinate server.

Next, with reference to the flow charts shown in FIGS. 9A and 9B, and further FIG. 10, processing when the electronic document file is looked up in the subordinate server 12-1 is described. At step S1 in the subordinate server 12-1 shown in FIGS. 9A and 9B, when a request for looking up is received from a client computer 16-11 connected to the subordinate server 12-1, an electronic document file list 40 is looked up, and then the "document α" of the electronic document file 72-1 in an electronic document storage area 36 obtained from the list is looked up. In this procedure of looking up, checking is made whether or not the electronic document file 72-1 looked up at step S2 is present on the change history list 44. If the electronic document file 72-1 subject to look-up is present on the change history list 44, the system gains access to the host server 10 at step S3, and copies the "document α" of the electronic document file 72-0 stored in the electronic document storage area 30 into the electronic document storage area 36 of the subordinate server 12-1, and replaces the stored electronic document file 72-1 with the copied electronic document file 72-0. Next, at step S4, the record describing a change event 74 of the "document α" is deleted from the change history list 44, and processing ends As described above, before the client computer 16-11 requests the subordinate server 12-1 to look up the "document α" of the electronic document file 72-1, since the use frequency of the electronic document file 72-1 is high, an event notice list 42 as to the document α is created in advance, and the "document α" is stored on the event notice list 28-1 of the host server 10 as an electronic document file with high use frequency. Because of this, if the same "document α" of the electronic document file is changed in another subordinate server 12-2, an event notice is notified to the subordinate server 12-1, and stored on the change history list 44. Therefore, after that if the client computer 16-11 looks up the "document α" of the electronic document file 72-1, the "document α" of the electronic document file 72-0 after change, that is stored in the host server 10, is copied, such that the client computer can look up the latest electronic document file. While at step S2 shown in FIGS. 9A and 9B, if the change history regarding the "document α" of the electronic document file 72-1 is not present on the change history list 44, the system goes to step S5, and checks if the looked up "document α" of the electronic document file 72-1 is present on an event notice list 42 of the subordinate server 12-1. If the "document α" of the electronic document file name is present on the event notice list 42, process ends. This state means that because in the subordinate server 12-1, the use frequency of the "document α" of the electronic document file is high, the event notice list 42 is created, and stored on the event notice list 28-1 of the host server 10, but the "document α" of the electronic document file is not updated by another server, for example, by the subordinate server 12-2, or a history change notice is not made to the change history list 44, although the file is updated. Therefore, since the latest "document α" of the electronic document file at this time is the electronic document file 72-1 stored in the electronic document storage area 36 of the subordinate server 12-1, in response to a look-up request from the client computer 16-11, the client computer is allowed to look up the "document α" of the electronic document file 72-1 stored in the electronic document storage area 36 of the subordinate server 12-1, without the need of copying operation from the host server 10. If the electronic document file looked up at step S5 shown in FIGS. 9A and 9B is not present on the event notice list 42, the system goes to step S6, and checks if the looked up electronic document file is present in the electronic document storage area 36. If the file is not present in the electronic document storage area 36, at step S9, the system gains access to the host server 10, and copies and stores the "document α" of the electronic document file 72-0 from that electronic document storage area 36 onto the electronic document storage area 30 of the subordinate server 12-1, such that the client computer 16-1 is allowed to look up it. At step S6, if the looked up electronic document file is present in the electronic document storage area 36 of the subordinate server 12-1 as the electronic document file 72-1, the latest date and time of updating is compared at step S7, between said file 72-1 and the electronic document file 72-0 of the host server 10 corresponding to the electronic document file 72-1 looped up in the subordinate server 12-1. If the comparison of the latest date and time of updating shows at step S8, that the electronic document file 72-0 of the host server is newer than the electronic document file 72-1 of the subordinate server 12-1, the system goes to step S9, and copies the electronic document file 72-0 from the host server 10 onto the subordinate server 12-1, such that the client computer 16-11 is allowed to look up the copied file. Needless to say, if the latest date and time of updating the electronic document file 72-1 of the subordinate server 12-1 is new, the file is not copied from the host server 10, but instead, the client computer 16-11 is allowed to look up the electronic document file 72-1 stored in the subordinate server 12-1.

Figure 11:
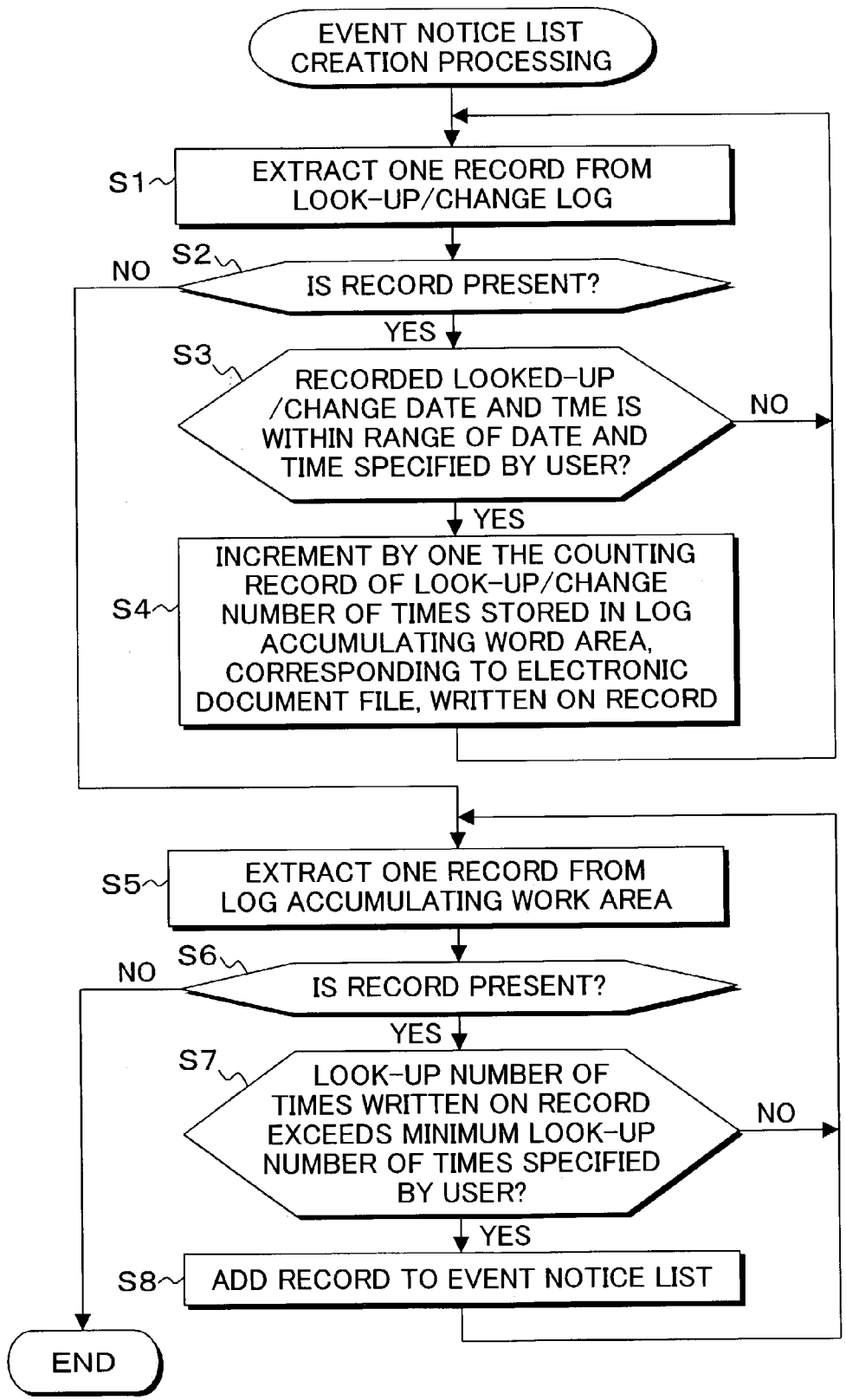
FIG. 11 is a flow chart showing processing for creating an event notice list according to the present invention.

FIG. 11 is a flow chart showing processing for creating an event notice list to be created by an event notice list creating function unit 50 provided on the subordinate server 12-1 shown in FIGS. 2A and 2B. Taking such a case as an example, where an event notice list 42 is created in the subordinate server 12-1 shown in FIGS. 2A and 2B, the process for creating the event notice list is described as follows. Steps S1 through S4 are steps for creating a log accumulation work area 48 from a look-up/change log 46. First at step S1, the event notice list creating function unit 50 takes 1 record out of the look-up/change log 46 present in the subordinate server 12-1. Then at step S2, if the record is present on the look-up/change log 46, said unit takes out 1 record, and at step S3, checks if the date and time of looking-up/changing the electronic document file archived in the record taken out at step S3 is the date and time within a range specified by the user. If the date and time is within the specified range, 1 is added to the look-up/change number of times of the record corresponding to the electronic document file archived in the record, that is expanded in the log accumulation work area 48 at step S4. If the record is not present in the log accumulation work area 48, a record of the name of the electronic document file currently under processing is added to the log accumulation work area 48, and 1 is set for the look-up/change number of times. Steps from step S5 through S8 are steps for creating the event notice list 42 from the log accumulation work area 48, that is created at step S1 through S4. In other words, at step S5, 1 record is taken out of the log accumulation work area 48. Then at step S6, if the record is present in the log accumulation work area 48, 1 record is taken out, and the look-up/change number of times of the electronic document file archived in the record taken out at step S7 is checked if said number of times exceeds the minimum look-up number of times set by the user. At step S6 through S8, if the number exceeds the minimum look-up number of times, the name of the electronic document file indicated by that record is added to the event notice list 42. When no record is present in the log accumulation work area 48, a series of processing ends.

Figure 12:
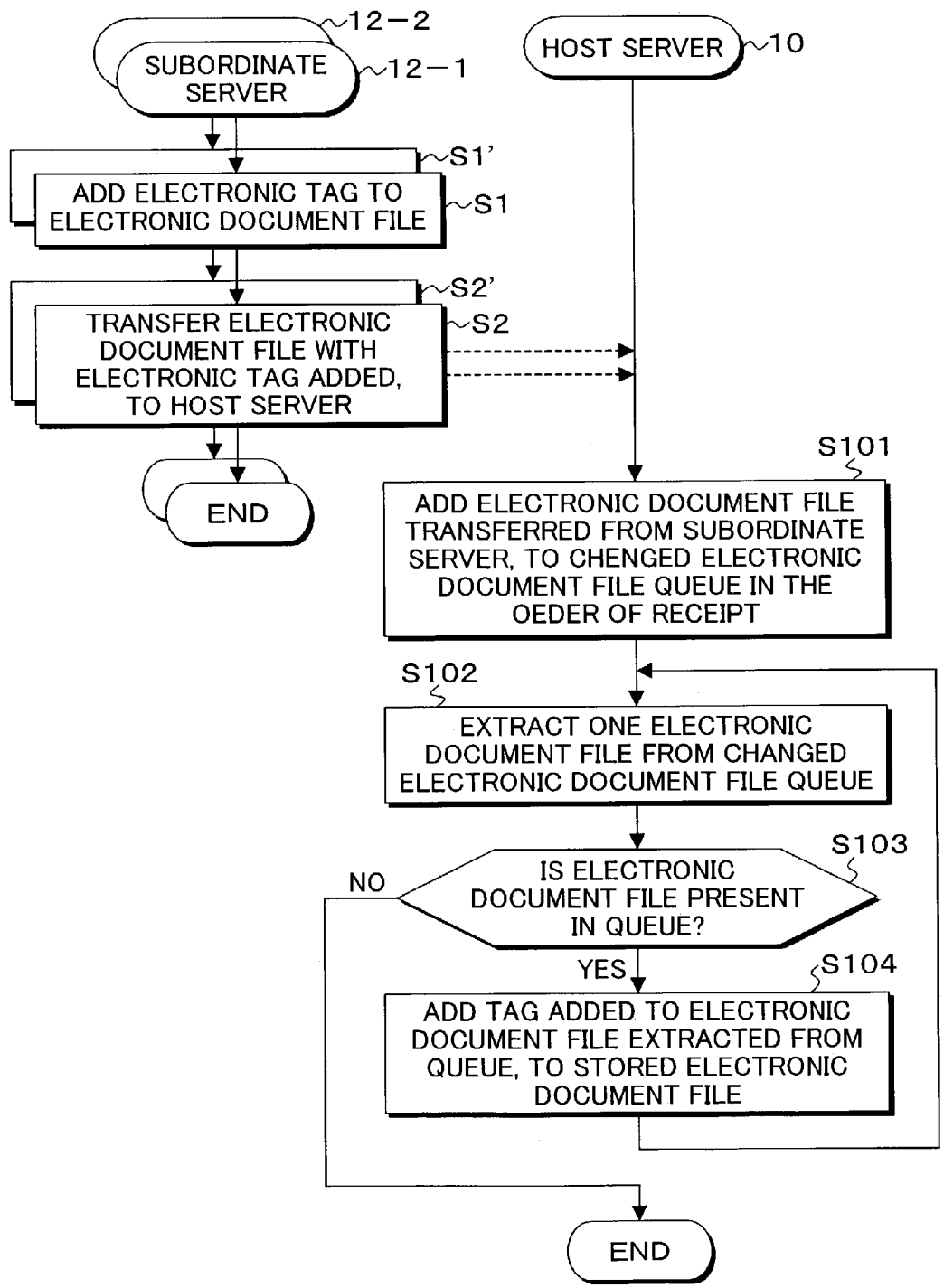
FIG. 12 is a flow chart showing a change/competition processing for merging an electronic tag according to the present invention.

FIG. 12 is a flow chart showing a change/competition processing for merging an electronic tag according to the present invention. In other words, it shows procedures of competition processing when a change processing of an electronic document file is performed, and the changed file is copied onto a host server, wherein the change processing is executed by means of adding electronic tags to the same electronic document file at the same time in a plurality of subordinate servers.

Figure 13:
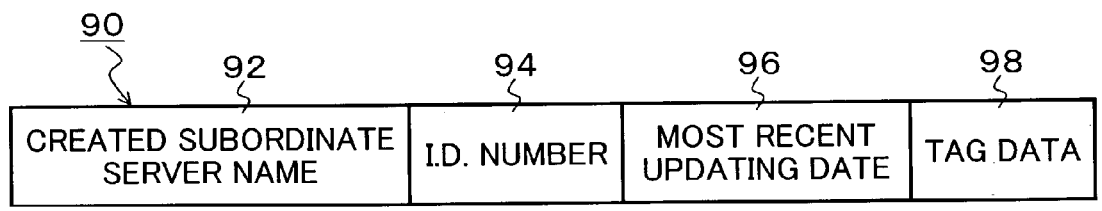
FIG. 13 is a diagram for describing a data structure for an electronic tag.

First of all, referring to FIG. 13, a data structure for an electronic tag is described. This electronic tag 90 is a record that holds a creator subordinate server name 92, I.D. No. 94, the latest date and time of updating 96, and a tag data described by a user 98.

Figure 14A:
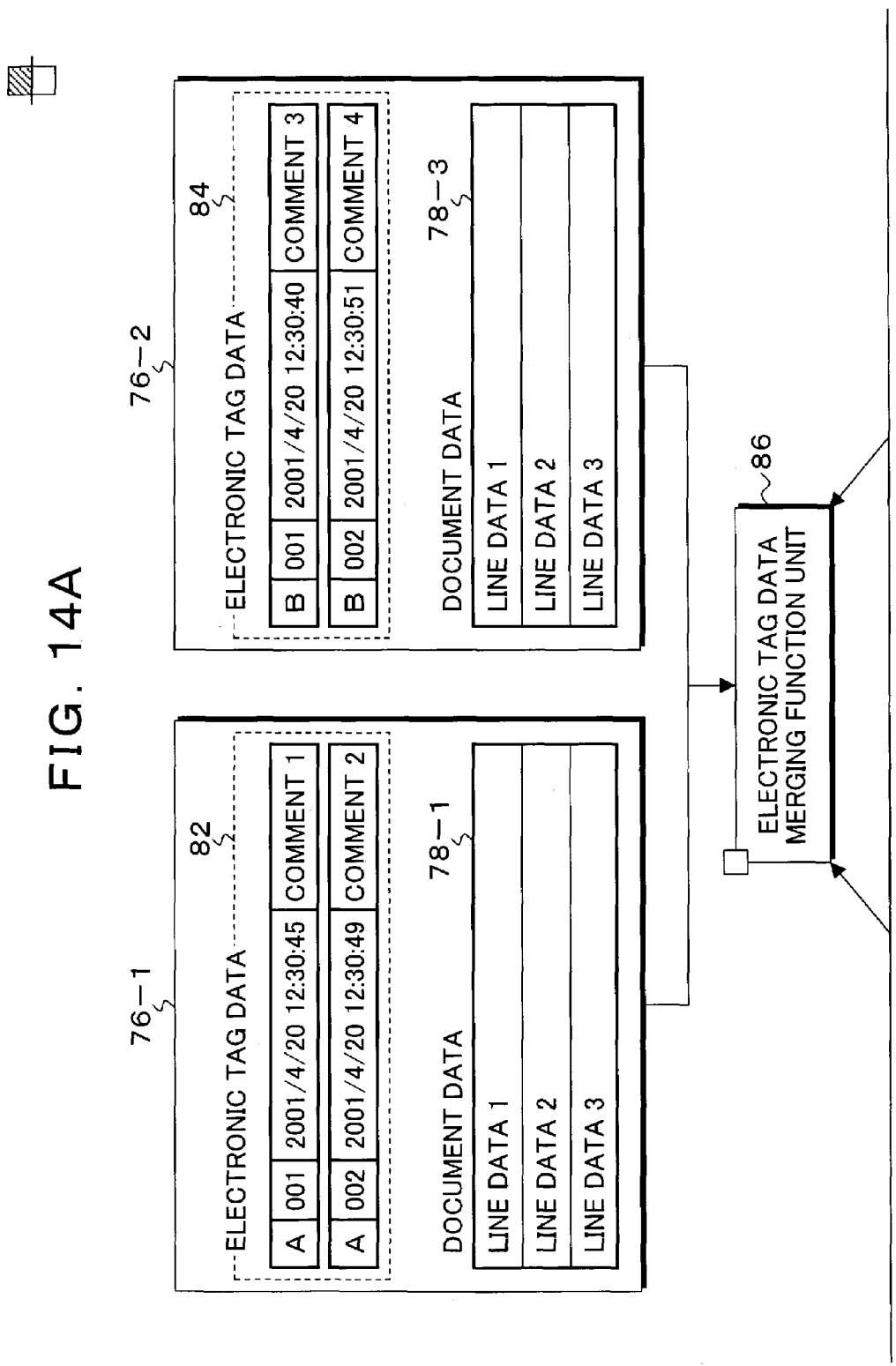
FIGS. 14A and 14B are diagrams for describing transition of the contents of an electronic document file in a change/competition processing for merging an electronic tag according to the present invention.
Figure 14B:

FIGS. 14A and 14B show transition in the contents of an electronic document file in the change/competition processing for merging an electronic tag according to the present invention, and a merging function in the host server. Currently, for an electronic document file 76-01 stored in the host server, for example, the electronic document file 76-01 is changed in the subordinate server 12-1, and an electronic document file 76-02 is changed in the subordinate server 12-2. To the electronic document file 76-01 of the host server, an electronic tag data 80-1 that has been so far changed is added, in addition to a document data 78-01. To the electronic document file 76-01 of the subordinate server 12-1, an electronic tag data 82 added in the subordinate server 12-1 is added, in addition to the document data 78-01. Furthermore, to the electronic document file 76-02 of the subordinate server 12-2, an electronic tag data 84 that is newly added to the same document data 78-3 is added. As described above, three different electronic tag data 80-1, 82 and 84 held by the electronic document files 76-01, 76-1 and 76-2 are merged by an electronic tag data merging function unit 86 provided on the host server 10, and the document data 78-02 with the added electronic tag data 80-2 is stored as an electronic document file 76-02.

Referring to the flow chart shown in FIG. 12, such a change/competition processing for merging an electronic tag is described as follows. In the subordinate servers 12-1 and 12-2, change is made by means of adding the electronic tag data 82 and 84 to the electronic document files 76-1 and 76-2, respectively, like steps S1 and S1'. When the electronic document file is changed, the changed electronic document files 76-1 and 76-2 are transferred from the subordinate servers 12-1 and 12-2 to the host server 10 at the next steps S2 and S2'. On the side of the host server 10, the electronic tag data merging function unit 86 receives the changed electronic document files 76-1 and 76-2 from the subordinate servers 12-1 and 12-2 at step S101, and adds them to a changed electronic document file queue in the unit. Next at step S102, one electronic document file is taken out of the changed electronic document file queue. And then at step S103, the changed electronic document file queue is checked if it includes any electronic document file, and if not, processing ends. If present, at step S104, the electronic document file 76-01 held by the host server 10 at this time, and the electronic document file taken out of the changed electronic file queue, for example, the electronic document file 76-1 from the subordinate server 12-1 are merged by processing of the electronic tag data merging function unit 86. By the repetition of similar processing at steps S102 through S104 on the electronic document file 76-2 from the subordinate server 12-2, the electronic tag data 84 of the electronic document file 76-2 is further merged by the electronic tag data merging function unit 86. When merging processing is finished, like the electronic document file 76-02 shown in FIGS. 14A and 14B, the electronic document file 76-2 is generated, where the electronic tag data 80-2, obtained by means of merging three electronic tag data 80-1, 82 and 84, is added to the document data 78-02, and the generated file is stored in the electronic document storage area 30 of the host server 10. Because of this, when a client computer of the subordinate server looks up an electronic document file, it can look up the electronic document file where all the electronic tag data up to now are merged and added.

As described above, according to the present invention, the presence of an electronic document file is beforehand notified to a host server, wherein the frequency of the file being used in a subordinate server is high, and in case when this electronic document file is copied from another server because of a change made by the addition of an electronic tag, the change that really took place is notified to a subordinate server, but copy is not made until the electronic document file is really looked up, and the electronic document file is transferred from the host server to the subordinate server for the first time when the electronic document file is looked up. Therefore, this system reduces the data transfer amount on the network between the host server and subordinate server, and communicating number of times as well, and in addition, the network load can be reduced. Also, since only the electronic document file to be looked up is transferred from the host server, and is stored in the subordinate server, the electronic document file storage area in the subordinate server can be reduced. In addition, even if a change competition takes place in the host server after an electronic tag is added to the same electronic document file in a plurality of subordinate servers at the same time, so as to change the electronic document file, the addition of an electronic tag to the same electronic document file that is made individually in subordinate servers can be all reflected into the look-up service in the subordinate servers, by means of merging and storing all the change results.

In order to simplify the description, the embodiment takes a case as an example, where three subordinate servers are provided to a host server, but of course an embodiment is not limited to this.

The above-mentioned embodiment takes a case as example, where a client computer is connected to a subordinate server through an intranet, but a subordinate server can be connected to the Internet such that a client computer can look up and change an electronic document file by the WWW web, allowing a subordinate server to have a function of a WWW server. This point is also the same as to the relation between the host server and subordinate server.

A preferred timing in which an event notice list is created in a subordinate server is that a time schedule for creating an event notice list is prepared in advance, for example, on a day-to-day basis, and an event notice list is created with a specific time interval or with a time interval corresponding to the frequency of transactions and sent to a host server, so that the latest use state can be always reflected.

Furthermore, the present invention provides a program, that signals management processing of an electronic document file of the present invention in a host server and a subordinate server, and programs for the host server and the subordinate server are configured to include parts of the host server and the subordinate server as shown in the flow chart of the above embodiment.

The present invention can include appropriate variants without impairing the object and advantages thereof, and is not limited by numerical values indicated in the above embodiment.

What is claimed is:

1. An electronic document management method in which an electronic document file is kept in a host server, the electronic document file being copied onto a plurality of subordinate servers so that clients look up or change the electronic document file in each subordinate server, the method comprising:

creating an event notice list for electronic document files kept in a subordinate server, the event notice list being a list of electronic document files having a high frequency of use, and copying the event notice list onto the host server so that the host server keeps the event notice list on a subordinate-server-by-subordinate-server basis, wherein the subordinate server creates a log when a client looks up or changes an electronic document file, and at a predetermined timing, accumulates look-up number of times and updating number of times from the log, if the accumulated look-up number of times exceeds a predetermined number of times, the subordinate server creates the event notice list for copying onto the host server;

when a change of an electronic document file takes place in a certain subordinate server, copying the changed electronic document file onto the host server, making a check of whether the changed electronic document file is present or not on event notice lists of other subordinate servers kept by the host server, and only when the changed electronic document file is present, notifying a change event to the other subordinate servers to store the change event on a change history list; and when the subordinate server receives a request for looking up an electronic document file, and if the requested electronic document file is present on the change history list, copying a corresponding electronic document file from the host server such that a requester is allowed to look up the electronic document file.

2. The method according to claim 1, wherein the change of the electronic document file includes adding an electronic tag to the electronic document file.

3. The method according to claim 1, wherein the subordinate server deletes the change history of an already copied electronic document file from the change history list, if the looked up electronic document file is present on the change history list such that the corresponding electronic document file is copied from the host server for allowing the client to look up the electronic document file.

4. The method according to claim 1, wherein the subordinate server looks up the event notice list if the electronic document file requested for looking up is not present on the change history list, and wherein the subordinate server allows the client to look up the electronic document file stored in an electronic document storage if it is present on the event notice list.

5. The method according to claim 4, wherein the subordinate server copies an electronic document file stored in the host server onto the electronic document storage area for allowing the client to look up the electronic document file, if the electronic document file requested for looking up is not present in the electronic document storage area.

6. The method according to claim 4, wherein if the electronic document file requested for looking up is present in the electronic document storage area, and if the last updating date of the electronic document file stored in the host server is most recent, the subordinate server copies the electronic document file onto the electronic document storage area for allowing the client to look up.

7. The method according to claim 1, wherein when a competition of change takes place, after clients add an electronic tag to the same electronic document file copied from the host server for updating the electronic document file, in a plurality of subordinate servers, so that the updated electronic document files are copied onto the host server simultaneously in terms of the time, all the electronic tags added in each subordinate server are merged and added to the electronic document file.

8. An electronic document management method for a subordinate server in which when a plurality of electronic document files kept in a host server are copied, clients look up or change the plurality of electronic document files, the method comprising:

creating an event notice list for stored electronic document files, the event notice list being a list of electronic document files having a high frequency of use, and copying the event notice list onto the host server such that the host server keeps event notice lists on a subordinate-server-by subordinate-server basis, and if a change is made in an electronic document file, copying the changed electronic document file onto the host server;

storing on a change history list a change event to be notified when the electronic document file, that is changed by another subordinate server, is present on the event notice list of the subordinate server held by the host server;

copying a corresponding electronic document file from the host server for allowing looking up, when an electronic document file is requested for looking up, and if the requested electronic document file is present on the change history list; and creating a log when a client looks up or changes an electronic document file, and at a predetermined timing, accumulating look-up number of times and updating number of times from the log, and if the accumulated look-up number of times exceeds a predetermined number of times, creating the event notice list for copying onto the host server.

9. The method according to claim 8, wherein the change of the electronic document file includes adding an electronic tag to the electronic document file.

10. The method according to claim 8, further comprising deleting the change history of an already copied electronic document file from the change history list, if the looked up electronic document file is present on the change history list such that the corresponding electronic document file is copied from the host server for allowing the client to look up the electronic document file.

11. The method according to claim 8, further comprising looking up the event notice list if the electronic document file requested for looking up is not present on the change history list, and allowing the client to look up the electronic document file stored in an electronic document storage if it is present on the event notice list.

12. The method according to claim 11, further comprising copying an electronic document file stored in the host server onto the electronic document storage area for allowing the client to look up the electronic document file, if the electronic document file requested for looking up is not present in the electronic document storage area.

13. The method according to claim 11, further comprising, if the electronic document file requested for looking up is present in the electronic document storage area, and if the last updating date of the electronic document file stored in the host server is most recent, copying the electronic document file onto the electronic document storage area for allowing the client to look up.

14. An electronic document management method for a host server, which keeps an electronic document file, the host server copying the electronic document file onto a plurality of subordinate servers such that clients look up and change the electronic document file in each subordinate server, the method comprising:

copying from a subordinate server an event notice list for electronic document files stored in the subordinate server, the event notice list being a list of electronic document files having a high frequency of use, to hold a copied list on a subordinate-server-by-subordinate-server basis, wherein the subordinate server creates a log when a client looks up or changes an electronic document file, and at a predetermined timing, accumulates look-up number of times and updating number of times from the log, if the accumulated look-up number of times exceeds a predetermined number of times, the subordinate server creates the event notice list for copying onto the host server;

when a change of an electronic document file takes place in a certain subordinate server, copying the changed electronic document file and checking whether the changed electronic document file is present on an event notice list of another subordinate server, and only when the changed electronic document file is present, notifying a change event to other subordinate servers, for storing the change event on the change history list;

only when the electronic document file requested for look up in the subordinate server is present on the change history list, copying a corresponding electronic document file onto the subordinate server for looking up.

15. The method according to claim 14, wherein the change of an electronic document file includes adding an electronic tag to an electronic document file in the subordinate server.

16. A method according to claim 14, wherein when a competition of change takes place, after clients add an electronic tag to the same electronic document file for updating the electronic document file, in a plurality of subordinate servers, so that the updated electronic document files are copied onto the host server simultaneously in terms of the time, all the electronic tags added in each subordinate server are merged and added to the electronic document file.

17. A computer-readable storage medium encoded a program allowing a computer forming a subordinate server, on which a plurality of electronic document files kept in a host server are copied such that a client is allowed to look up or change the plurality of electronic document files, the program executing a method comprising:

creating an event notice list for stored electronic document files, the event notice list being a list of electronic document files having a high frequency of use, and copying the event notice list onto the host server such that the host server keeps event notice lists on a subordinate-server-by-subordinate-server basis, wherein the subordinate server creates a log when a client looks up or changes an electronic document file, and at a predetermined timing, accumulates look-up number of times and updating number of times from the log, if the accumulated look-up number of times exceeds a predetermined number of times, the subordinate server creates the event notice list for copying onto the host server;

if a change is made in an electronic document file, copying the changed electronic document file onto the host server;

storing on a change history list a change event to be notified when the electronic document file, that is changed by another subordinate server, is present on the event notice list of the subordinate server held by the host server; and copying a corresponding electronic document file from the host server for allowing looking up, when an electronic document file is requested for looking up, and if the requested electronic document file is present on the change history list.

18. A computer readable storage medium encoded a program allowing a computer forming a host server which stores an electronic document file and which copies the electronic document file onto a plurality of subordinate servers such that a client looks up or changes the electronic document file in each subordinate server, the program executing a method comprising:

copying from a subordinate server an event notice list for the electronic document files stored in the subordinate server, the event notice list being a list of electronic document files having a high frequency of use, to hold the copied event notice list on a subordinate-server-by-subordinate-server basis, wherein the subordinate server creates a log when a client looks up or changes an electronic document file, and at a predetermined timing, accumulates look-up number of times and updating number of times from the log, if the accumulated look-up number of times exceeds a predetermined number of times, the subordinate server creates the event notice list for copying onto the host server;

when a change of an electronic document file takes place in a certain subordinate server, copying the changed electronic document file and checking whether the changed electronic document file is present on an event notice list of another subordinate server, and only when the changed electronic document file is present, notifying a change event to other subordinate servers, for storing the change event on a change history list; and only when an electronic document file requested for look up in the subordinate server is present on the change history list, copying a corresponding electronic document file onto the subordinate server for looking up.

* * * * *

UNITED STATES PATENT AND TRADEMARK OFFICE
CERTIFICATE OF CORRECTION

PATENT NO. : 7,188,126 B2  Page 1 of 1
APPLICATION NO. : 10/358895
DATED : March 6, 2007
INVENTOR(S) : Ken Murata et al.

It is certified that error appears in the above-identified patent and that said Letters Patent is hereby corrected as shown below:

Column 15, Line 15, change "subordinate-server-by subordinate" to --subordinate-server-by-subordinate--.

Signed and Sealed this

Eighteenth Day of March, 2008

JON W. DUDAS
*Director of the United States Patent and Trademark Office*